United States Patent Office 3,178,479
Patented Apr. 13, 1965

3,178,479
PRODUCTION OF DIALKYLHYDRAZINES
John B. Tindall, Terre Haute, Ind., assignor to Commercial Solvents Corporation, New York, N.Y., a corporation of Maryland
No Drawing. Filed Dec. 16, 1960, Ser. No. 76,110
9 Claims. (Cl. 260—583)

My invention relates to the production of dialkylhydrazine, and more particularly, it relates to production of dialkylhydrazine by the catalytic reduction of nitrosodialkylamine.

Prior processes for production of dialkylhydrazine have universally included the intermediate production of N-nitrosodialkylamine and reduction of the latter material with zinc and acetic acid. The complete process including reduction of N-nitrosodialkylamine by this particular means is illustrated by the process for producing N-nitrosodimethylamine and dimethylhydrazine described in Organic Syntheses, Collective Volume 2, page 211, John Wiley and Sons, New York (1943). Other N-nitrosodialkylamines can be produced in the same manner.

I have now discovered a new process for production of dialkylhydrazine which does not require reduction of N-nitrosodialkylamine by the use of the previously employed zinc and acetic acid. My new process is convenient and economical to operate and results in excellent yields of dialkylhydrazine.

My new process consists essentially of reducing N-nitrosodialkylamine with hydrogen in the presence of a catalyst to obtain dialkylhydrazine in excellent yields. The catalysts which I can employ in my process are palladium deposited on charcoal and platinum deposited on charcoal. In carrying out the reaction, I employ temperatures ranging from about 15 to 100° C. and hydrogen pressures of at least about 1 atmosphere.

Generally, I carry out my new process by charging the N-nitrosodialkylamine to be reduced to a suitable hydrogenation apparatus, adding the catalyst and then introducing hydrogen under pressure until there is no further pressure drop indicating cessation of absorption of the hydrogen. I then discharge the reaction mixture from the hydrogenation apparatus, separate the catalyst, and then recover the dialkylhydrazine by any suitable method, such as, for example, fractional distillation.

I have found it convenient in the operation of my process to conduct the hydrogenation of N-nitrosodialkylamine in solution in an inert solvent. Suitable inert solvents include water, alkyl alcohol, etc. Care should be taken to employ a solvent which does not have a boiling point so near to that of the product as to make separation by distillation difficult or impossible. I intend, therefore, to include within the scope of my process the hydrogenation of N-nitrosodialkylamine in solution in an inert solvent. However, whether in solution or not, degradation products of N-nitrosodialkylamine are often present or often formed if the N-nitrosodialkylamine is permitted to stand for excessive periods of time. Such degradation products may include nitrogen oxides, nitrous acid, etc., and these materials tend to poison the catalyst subsequently employed in the hydrogenation of N-nitrosodialkylamine to obtain dialkylhydrazine. In order to eliminate the possibility of the hydrogenation catalyst being poisoned and the conversion of N-nitrosodialkylamine to dialkylhydrazine from being sharply reduced, I prefer to contact the N-nitrosodialkylamine or solution thereof with a strongly basic anion exchange resin to remove the acidic impurities which might subsequently poison the hydrogenation catalyst. I also prefer to pass the N-nitrosodialkylamine or inert solvent solution thereof through a cation exchange resin to remove basic impurities, a procedure which subsequently enables a somewhat increased yield of dialkylhydrazine to be obtained. An alternative procedure involves passage of the N-nitrosodialkylamine or solution thereof through a monobed ion exchange resin consisting of a mixture of a basic anion exchange resin and an acidic cation exchange resin. Suitable acidic cation exchange resins such as those of the sulfonic acid type wherein activity is due to the presence of sulfonic acid groups include Amberlite IR-120 (a strongly acidic nuclear sulfonic acid type cation exchange resin), Amberlite IR-150 (a strongly acidic nuclear sulfonic acid type cation exchange resin), and Dowex (a strongly acidic nuclear sulfonic acid type cation exchange resin). Suitable basic anion exchange resins such as those in the hydroxide form include Dowex 1 (divinylbenzene type strongly basic anion exchange resin), Dowex 2 (divinylbenzene type strongly basic anion exchange resin), and Amberlite XE-75 (porous modified amine strongly basic anion exchange resin), Amberlite IRA-400 (modified amine strongly basic anion exchange resin). Procedures for contacting the nitrosodialkylamine or solution thereof with ion exchange resins are well known to those skilled in the art and can be accomplished by any suitable means.

I prefer, in contacting the N-nitrosodialkylamine with the ion exchange resin, to pass the N-nitrosodialkylamine directly through a tubular column packed with the ion exchange resin to be utilized. After passage of the N-nitrosodialkylamine through the ion exchange resin, the resin is washed with water and is then regenerated, in the case of the anion exchange resin with an hydroxide ion preferably in the form of sodium hydroxide, and in the case of the cation exchange resin with a mineral acid preferably sulfuric acid.

In connection with removal of impurities from N-nitrosodialkylamine or solutions thereof, which impurities tend subsequently to poison the hydrogenation catalyst during reduction of the N-nitrosodialkylamine to obtain dialkylhydrazine, I have found that N-nitrosodialkylamine starting materials which oxidize iodine and give a blue color with starch-iodide paper contain impurities which will subsequently poison the hydrogenation catalyst as indicated above. If no blue color is obtained when the N-nitrosodialkylamine starting material is tested with starch-iodide paper, the starting material can be employed without ion exchange treatment and the catalyst will not be poisoned. Thus I prefer to subject N-nitrosodialkylamine starting materials to a starch-iodide test prior to hydrogenation thereof in order to determine whether it is necessary to contact the N-nitrosodialkylamine with the ion exchange resin to remove catalyst poisons.

As indicated above, the catalysts which I can employ are palladium on charcoal and platinum on charcoal. Palladium and platinum can be deposited on charcoal in any convenient amount; however, I prefer to employ about 5% platinum or palladium on charcoal since I am able to obtain good contact of catalyst with N-nitrosodialkylamine at such concentrations and I have found such concentrations to be economical as far as the platinum and palladium are concerned and also insofar as satisfactory yields of dialkylhydrazine are concerned. Using a catalyst of such composition, I have found that I can obtain satisfactory results by using the catalyst in the amount of at least about 0.5% based on the weight of the N-nitrosodialkylamine. In other words, I employ at least about 0.025% of platinum or palladium metal which is present as a 5% by weight deposit on charcoal. Platinum or palladium deposited on charcoal in other amounts can also be used in my new process in which case I adjust the amount of the total mixture of platinum or palladium and charcoal so that the platinum or palladium is present in the reaction mixture in the amount of at least about 0.025%.

As stated above, I can employ temperatures ranging from about 15 to about 100° C. When the reaction is carried out at temperatures near the lower limit of this range, the reaction period required is longer than if a temperature in the middle of the range is employed while at temperatures near the upper limit of the range, the reaction period is considerably shortened. At temperatures of 100° C. and above, the yield of dialkylhydrazine is somewhat reduced due to the fact that increasing quantities of dialkylamine and ammonia are produced at the expense of dialkylhydrazine. I prefer to carry out my new process at temperatures ranging from about 40 to about 60° C.

In carrying out my new process, I employ a hydrogen pressure of at least about 1 atmosphere. At a reaction pressure of 1 atmosphere, the reaction time is somewhat longer than at pressures above this value such as, for example, about 50 to 200 atmospheres. While pressures above about 200 atmospheres can be employed, there does not appear to be any advantage as far as reaction time, yields, etc. are concerned. Generally, I prefer to employ pressures ranging from about 30 to 40 atmospheres when carrying out my new process.

The reaction time is a variable dependent upon reaction conditions. In practice, I continue the reaction by applying hydrogen under pressure to the mixture of nitrosodialkylamine and catalyst until cessation of hydrogen absorption ocurs at which time the reaction is complete and the N-nitrosodialkylamine substantially completely converted to dialkylhydrazine. Upon completion of the reaction, I filter the reaction mixture and recover the dialkylhydrazine preferably by fractionation.

This application is a continuation-in-part of my application Serial No. 527,148, filed August 8, 1955, and my application Serial No. 593,367, filed June 25, 1956, both abandoned.

The following examples are offered to illustrate my invention; however, I do not intend to be limited to the specific materials, proportions, or procedures described. Rather I intend to include within the scope of my invention all equivalents obvious to those skilled in the art.

*Example I*

A series of six runs was made wherein 900 grams of a 28.2% aqueous solution of N-nitrosodimethylamine along with 1.25 grams of a catalyst consisting of 5% palladium deposited on charcoal were charged to a stainless steel rocking bomb having a capacity of 1800 ml. Hydrogen was applied to the bomb at a pressure of 450–500 pounds per square inch until absorption of hydrogen ceased as indicated by lack of further pressure drop in the bomb. Prior to charging the bomb, the N-nitrosodimethylamine solution was passed through a column containing a cation exchange resin and subsequently through a column containing an anion exchange resin in order to remove catalyst poisons. The temperature of the reaction was 40° C. and the results are shown in the following table.

| Bomb Run | Time, Hours | Hydrogen Used, Moles/Mole NDMA [1] | Conversion, NDMA to DMH [2], Percent |
|---|---|---|---|
| A—2008 | 15.5 | 1.94 | 93.1 |
| A—2009 | 10.5 | 1.74 | 94.3 |
| A—2010 | 8.5 | 1.70 | 92.8 |
| A—2011 | 9.5 | 1.64 | 91.5 |
| A—2012 | 10.5 | 1.67 | 92.3 |
| A—2013 | 10.5 | 1.07 | 94.8 |

[1] NDMA—N-Nitrosodimethylamine.
[2] DMH—Dimethylhydrazine.

*Example II*

Into a suitable hydrogenation apparatus consisting of a Parr hydrogenator, 10 grams of N-nitrosodimethylamine, 90 grams of water, 0.5 gram of catalyst consisting of 5% palladium deposited on charcoal were charged. Hydrogen pressure was applied to the apparatus in the amount of 40 pounds per square inch and at the end of 70 minutes, the pressure had dropped to 18.5 pounds per square inch, there being no further drop in an additional 10 minutes. The temperature during the reaction was 40° C. The hydrogen absorbed corresponded to 1.96 moles per mole of N-nitrosodimethylamine present. The dimethylhydrazine formed corresponded to a conversion of 87.6% based on N-nitrosodimethylamine charged.

*Example III*

A 425-gram portion of a 23% aqueous solution of N-nitrosodimethylamine, previously contacted with the cation exchange resin Amberlite IR-120 and the anion exchange resin Amberlite IRA-400 was charged to the apparatus described in Example I along with 1.0 gram of a catalyst consisting of 5% platinum deposited on charcoal. Hydrogen was applied at a pressure of 450–500 pounds per square inch, the temperature being 40° C. The time of the reaction was 4.8 hours and the conversion of N-nitrosodimethylamine to dimethylhydrazine amounted to 90.5%.

*Example IV*

A series of two runs was conducted wherein 500 grams of a 28 percent aqueous solution of N-nitrosodimethylamine previously contacted with the cation exchange resin Amberlite IR-105 and the anion exchange resin Dowex 2 was charged to the apparatus described in Example I along with 0.7 gram of a catalyst consisting of 5.0% palladium on charcoal. Hydrogen was applied to the apparatus at a pressure of 450–500 pounds per square inch. In one run, the temperature was 18° C. and the time of the reaction 35 hours, the conversion of N-nitrosodimethylamine to dimethylhydrazine being 78.4%. In the other run, the temperature was 70° C., the time of the reaction 8.5 hours, the conversion being 88.8%.

*Example V*

Into the apparatus described in Example I was charged 500 grams of a 28% aqueous solution of N-nitrosodimethylamine previously contacted with the cation exchange resin Dowex 50 and the anion exchange resin Dowex 1 along with 1.0 gram of a catalyst consisting of 5% palladium deposited on charcoal. Hydrogen was applied at a pressure of 3000 pounds per square inch, the temperature of the reaction being 40° C. The reaction was continued for 12.5 hours at which time the hydrogen was still being absorbed at the rate of about 5% per hour. The conversion of N-nitrosodimethylamine to dimethylhydrazine at the end of 12.5 hours was 81.3%.

*Example VI*

Into the apparatus described in Example I was charged 397 grams of N-nitrosodiethylamine, 222 grams of methanol, 10 grams of a catalyst consisting of 5% palladium deposited on charcoal. Hydrogen was applied at a pressure of 500 pounds per square inch, the temperature of the reaction being 50° C. The time of the reaction was 13.5 hours and the conversion to diethylhydrazine was 81.2%.

*Example VII*

A mixture of 431 grams of N-nitrosodibutylamine, 152 grams methanol, and 8 grams of a catalyst consisting of 5% palladium deposited on charcoal was reacted for 7.5 hours in the manner described in Example VI. The conversion to dibutylhydrazine was 75%.

*Example VIII*

A mixture of 259 grams of N-nitrosomethylisopropylamine, 157 grams of methanol, and 5 grams of a catalyst consisting of 5% palladium deposited on charcoal was reacted for 27 hours in the manner described in Example VI. The conversion to methylisopropylhydrazine was 74.2%.

*Example IX*

A mixture of 258 grams of N-nitrosodipropylamine, 197 grams of methanol, and 5 grams of a catalyst consisting of 5% palladium on charcoal was reacted for 8.5 hours in the manner described in Example VI. The conversion to dipropylhydrazine was 76.0%.

Now having described my invention, what I claim is:

1. In a process for the production of lower dialkylhydrazines in improved yields by the reduction of lower N-nitrosodialkylamines in the presence of a catalyst selected from the group consisting of palladium on char and platinum on char, the improvement which comprises contacting the lower N-nitrosodialkylamine with an ion exchange resin selected from the group consisting of a strongly basic anion exchange resin, a strongly acidic cation exchange resin, and combinations thereof before the reduction step.

2. The process of claim 1 wherein the ion exchange resin is a strongly basic anion exchange resin.

3. The process of claim 1 wherein the ion exchange resin is a strongly acidic cation exchange resin.

4. The process of claim 1 wherein the ion exchange resin is a monobed ion exchange resin consisting of a mixture of a strongly acidic cation exchange resin and a strongly basic anion exchange resin.

5. The process of claim 1 wherein the lower N-nitrosodialkylamine is N-nitrosodimethylamine.

6. The process of claim 1 wherein the lower N-nitrosodialkylamine is N-nitrosodiethylamine.

7. The process of claim 1 wherein the lower N-nitrosodialkylamine is N-nitrosodibutylamine.

8. The process of claim 1 wherein the lower N-nitrosodialkylamine is N-nitrosomethylisopropylamine.

9. A process for the production of a lower dialkylhydrazine which comprises contacting a lower N-nitrosodialkylamine with an ion exchange resin selected from the group consisting of a strongly basic anion exchange resin, a strongly acidic cation exchange resin and combinations thereof and thereafter contacting the treated N-nitrosodialkylamine with hydrogen in the presence of a catalyst selected from the group consisting of palladium on charcoal and platinum on charcoal to produce a lower dialkylhydrazine.

References Cited in the file of this patent

FOREIGN PATENTS 727,565    Great Britain _____ Apr. 6, 1955

OTHER REFERENCES

Berkman et al: "Catalysis," page 372 (1940).